(12) United States Patent
Shirron et al.

(10) Patent No.: US 8,805,123 B2
(45) Date of Patent: Aug. 12, 2014

(54) SYSTEM AND METHOD FOR VIDEO RECOGNITION BASED ON VISUAL IMAGE MATCHING

(71) Applicant: Samsung Electronics Co., Ltd., Gyeonggi-do (KR)

(72) Inventors: Dan Shirron, Givaat Ada (IL); Tsvi Chaim Lev, Tel Aviv (IL); Amit Porat, Tel-Aviv Yaffo (IL); Aaron Lieber, Bat Yam (IL); Jacek Marciniak, Warsaw (PL); Adam Strupczewski, Warsaw (PL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 66 days.

(21) Appl. No.: 13/647,659

(22) Filed: Oct. 9, 2012

(65) Prior Publication Data

US 2014/0099028 A1    Apr. 10, 2014

(51) Int. Cl.
*G06K 9/00* (2006.01)
*G06T 7/00* (2006.01)
*G06F 17/24* (2006.01)

(52) U.S. Cl.
CPC ............ *G06F 17/243* (2013.01); *G06T 7/0083* (2013.01)
USPC .......................................... 382/305; 715/227

(58) Field of Classification Search
None
See application file for complete search history.

(56) References Cited

U.S. PATENT DOCUMENTS 7,295,718 B2 * 11/2007 Park et al. ............... 382/305
2011/0264700 A1   10/2011 Mei

OTHER PUBLICATIONS

Matas, J., Chum, O., "Large Scale ImageRetrieval" (2010), http://cw.felk.cvut.cz/lib/exe/fetch.php/courses/a4m33mpv/2010.03.08_large-cale-image-retrieval.pdf.
David G. Lowe, "Distinctive imagefeatures from scale-invariant keypoints," International Journal of Computer Vision, 60, 2 (2004), pp. 91-110.

* cited by examiner

*Primary Examiner* — Hadi Akhavannik
(74) *Attorney, Agent, or Firm* — Roach Brown McCarthy & Gruber, P.C.; Kevin D. McCarthy

(57) ABSTRACT

A method for identifying a stream of images, comprises: a) capturing one or more frames from the media which is to be identified; b) sending the selected image(s) as queries to a server; c) in the server, analyzing the one or more images to identify them from a database that for each movie stored comprises switched significantly different frames; d) if more than one image is processed, aggregating the various server's replies; and e) displaying the results to the user.

3 Claims, 8 Drawing Sheets

SYSTEM AND METHOD FOR VIDEO RECOGNITION BASED ON VISUAL IMAGE MATCHING

FIELD OF THE INVENTION

The present invention relates to image processing. More particularly, the invention relates to the identification of a media stream, such as a video movie that is being displayed on a screen.

BACKGROUND OF THE INVENTION

Correctly identifying a media stream can substantially improve viewer's experience. Particularly, such identification may allow a viewer to obtain metadata regarding the movie, e.g., on a mobile phone or on the TV set itself, if the movie is being watched on a TV set. Interesting metadata can include, for instance, the names of the actors, the director, the year of production, etc.

The art has approached this problem and attempts have been made to provide a solution, mostly based on soundtrack recognition, such as in US 2011/0264700, which provides a system for identifying online videos.

Solutions based on soundtrack are sensitive to surrounding noise. For example, if it is desired to recognize a TV show, all the people in the room must keep quiet. Furthermore sound recognition normally takes a long time.

The art has so far failed to provide a solution that enables fast and robust video identification, taking into account various environmental conditions, such as the distance from the screen, distortions, etc.

It is an object of the present invention to provide a method for identifying video content, which overcomes the disadvantages of prior art methods.

It is another object of the invention to provide apparatus and systems that employ the method of the invention.

Other objects and advantages of the invention will become apparent as the description proceeds.

SUMMARY OF THE INVENTION

In one aspect the invention relates to a method for identifying a stream of images, comprising:
  a. Capturing one or more frames from the media which is to be identified;
  b. Sending the selected image(s) as queries to a server;
  c. in the server, analyzing the one or more images to identify them from a database that for each movie stored comprises switched significantly different frames;
  d. if more than one image is processed, aggregating the various server's replies; and
  e. displaying the results to the user.

In one embodiment of the invention a method is performed, wherein:
  1) Each result returned from the matching server is added to a time histogram;
  2) The histogram divides each film to short time slots.
  3) With each result added to the histogram all histograms are checked for a significant maximum point by applying a moving window to each histogram and summing the results; and
  4) If a sum of results in a window is bigger by a desired threshold from all other windows, declaring a winner.

The invention also encompasses a system for identifying a stream of images, comprising one or more servers associated with storage comprising a database that for each movie stored contains significantly different frames, said servers being provided with circuitry suitable to analyze the one or more images to be identified, and with communication lines suitable to exchange data with a client device.

DETAILED DESCRIPTION OF THE INVENTION

In one embodiment of the invention the user will utilize areas smart phone or other portable device to carry out the invention, as follows:
  1) the user aims his portable device's camera at the desired media screen (e.g. TV, PC, Tablet).
  2) After a few seconds (4 to 10 is an acceptable waiting time for the average user) the device displays information about the movie shown on the media screen. Such information may contain title, actor names, time stamp of the movie, etc.

In this this particular embodiments of inventions the system consists of a client device (such as a mobile device) and a server (cloud based service). The client device is responsible for the following activities:
  1) Capturing the media which is to be identified.
  2) Making a smart selection from the captured images using an image processing algorithm, as further explained hereinafter with reference to FIG. 2.
  3) Sending the selected images as queries to the server.
  4) Aggregating the various server's replies, make the smart calculation and come up with a definite result, as further described hereinafter in detail with reference to FIG. 2.
  5) Displaying the results to the user.

The server side includes the following activities:
  1) A request/reply queue that buffers the various identification requests from different users.
  2) Forwarding each request is to an available search engine in the cloud.
  3) Running the search algorithm in the selected search engine against all images in the database and returning a probability list of matches.
  4) Returning the reply to the client who sent the request.

Figure 1:
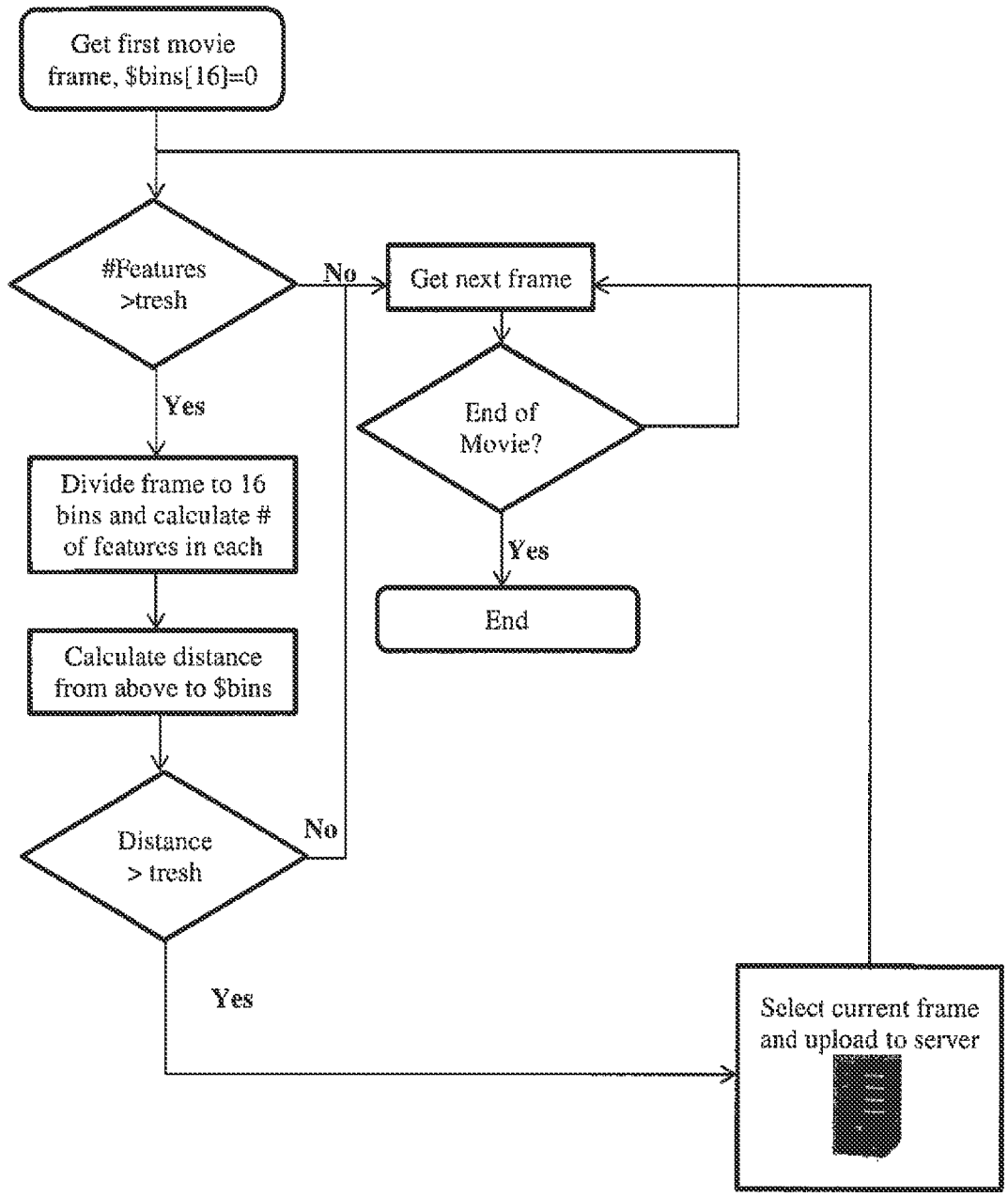
FIG. 1 is a flow chart that schematically illustrates a server database smart creation process.

The server database creation process is schematically shown in FIG. 1. The server database contains significant/unique images for each host movie. By "significant/unique" it is meant that instead of putting all the images of a hosted movie in the database only images that are substantively different/unique are selected and stored. For example if there is a long static scene in which the camera shows 2 persons talking and there is not much movement or change in the scene, only one picture will be stored. On the other hand, if there is a very dynamic scene from an action movie, the database should include many images from that scene. The logics is similar to what is done in video compression algorithms in which only significant frames are stored, with the difference that according to the invention there is no need to store information required to re-create intermediate frames. One alternative for a "smart" database creation is illustrated in FIG. 1. Each new movie is analyzed frame by frame:
  a) Each frame is tested for the number of features in it. If the number of features is lower than a threshold the next frame is tested;
  b) Each frame is divided into 16 areas (bins) and the number of features in each bin is counted;
  c) The number of features in each bin currently tested is then compared to the number of features in each bin of the last frame that was selected for upload to the server;
  d) If the total difference between the number of features in each bin crosses a desired threshold, the frame is considered to be significantly different from the last frame that was selected.

Figure 2:
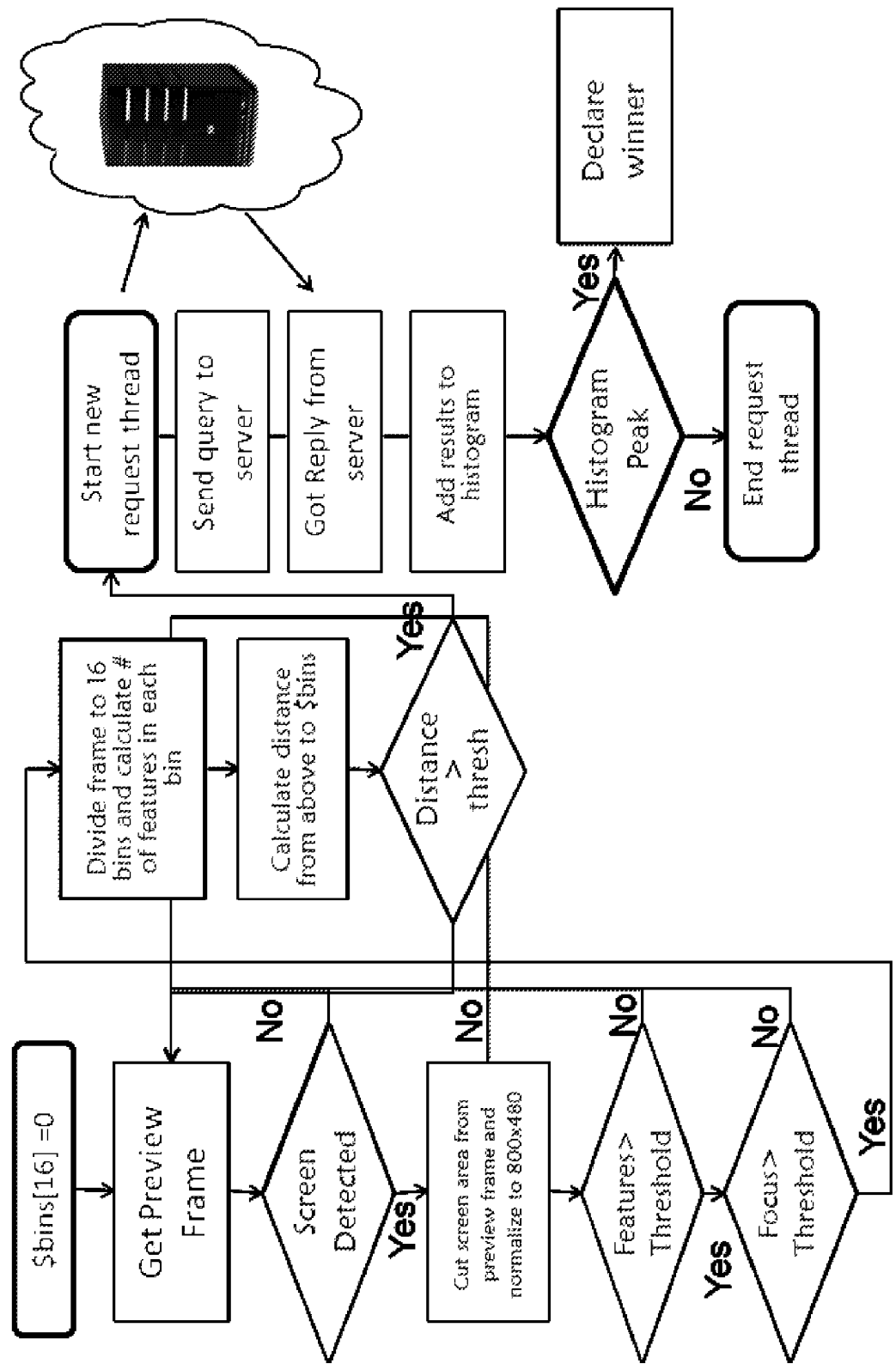
FIG. 2 is a flowchart that schematically illustrates a client smart capture and result aggregation process.
Figure 3:
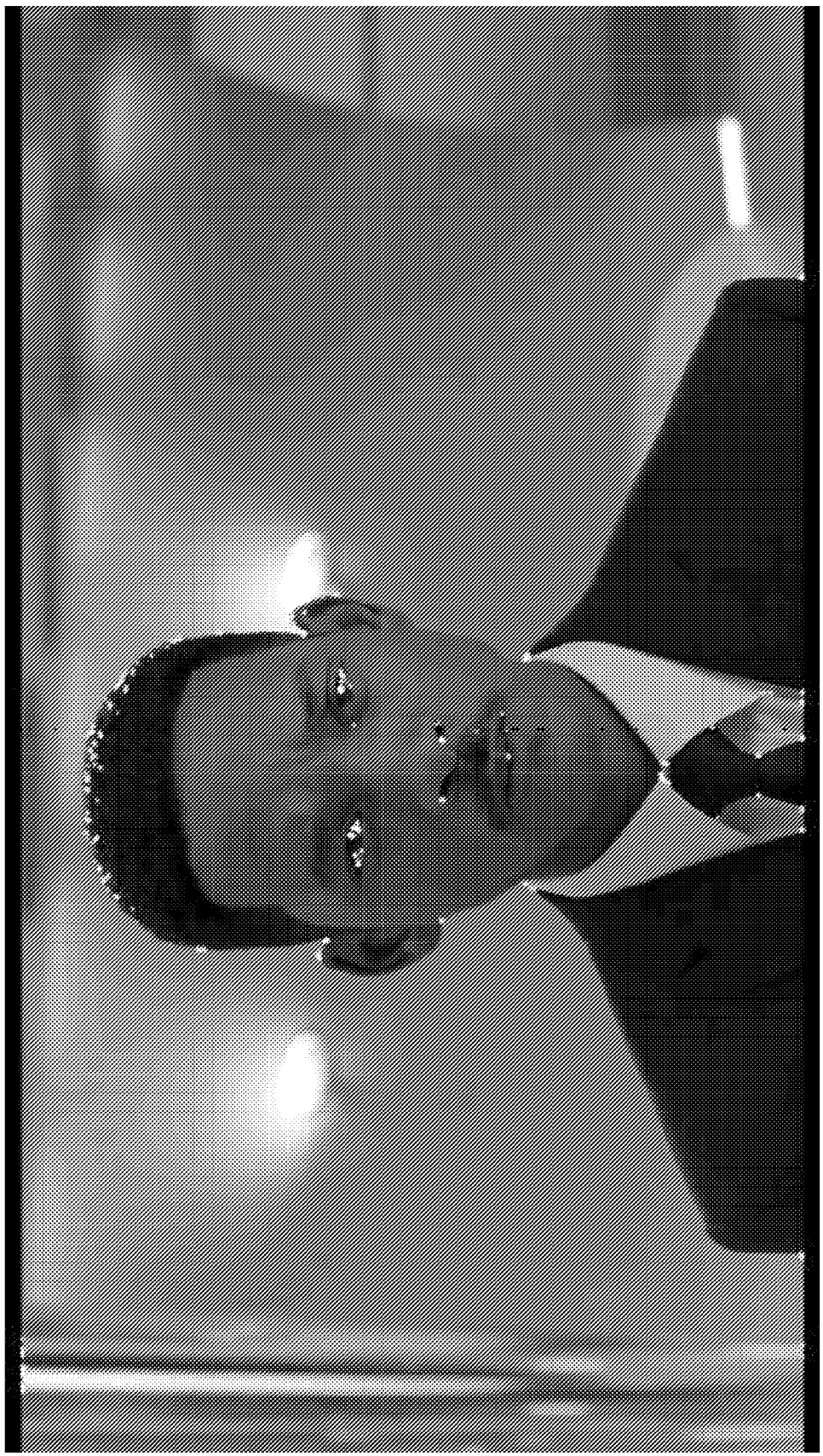
FIG. 3 is an image from the "Men in Black III" movie, showing selected features.
Figure 4:
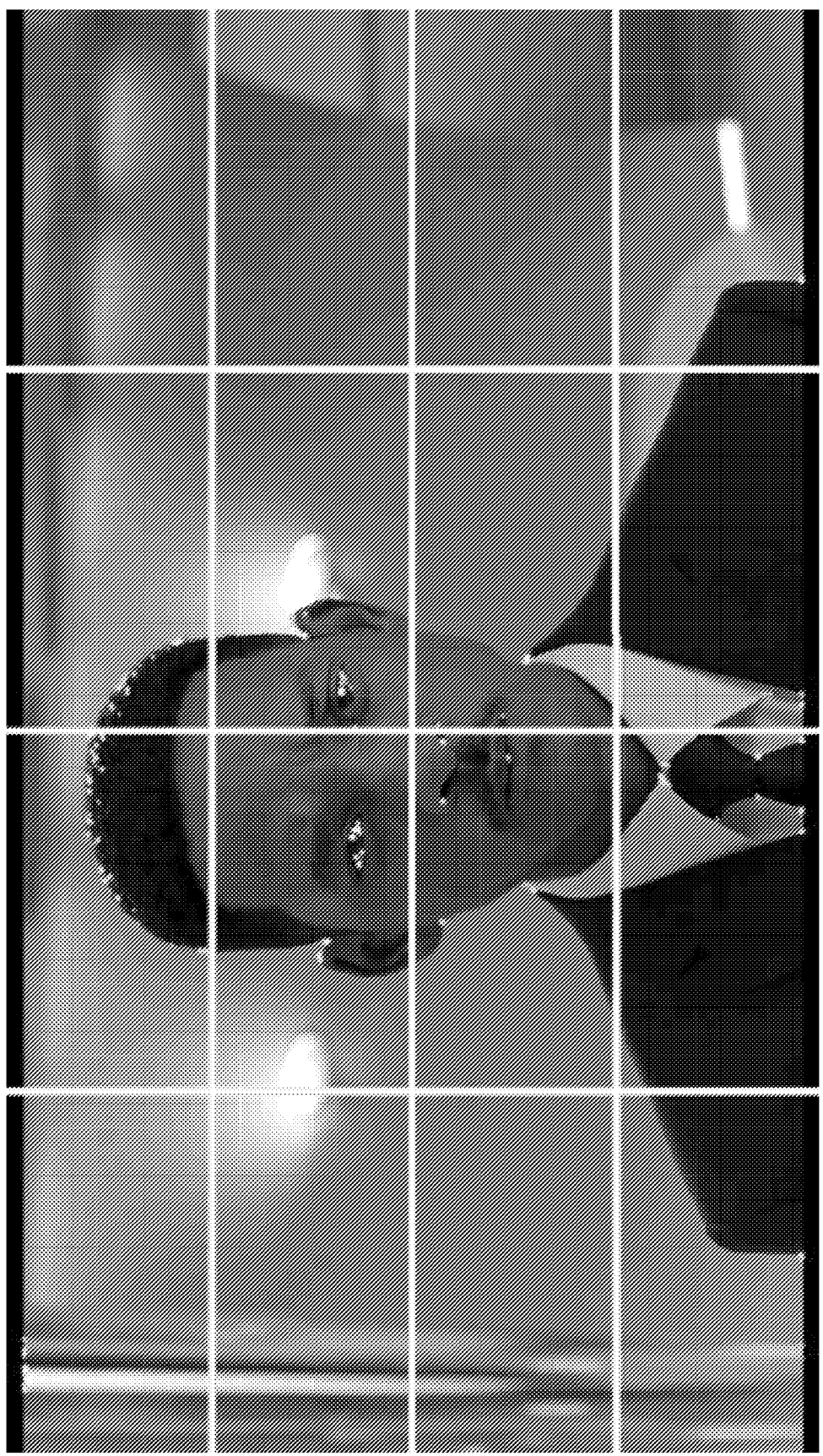
FIG. 4 is the image of FIG. 3, on which split to "feature bins" have been marked.
Figure 5:
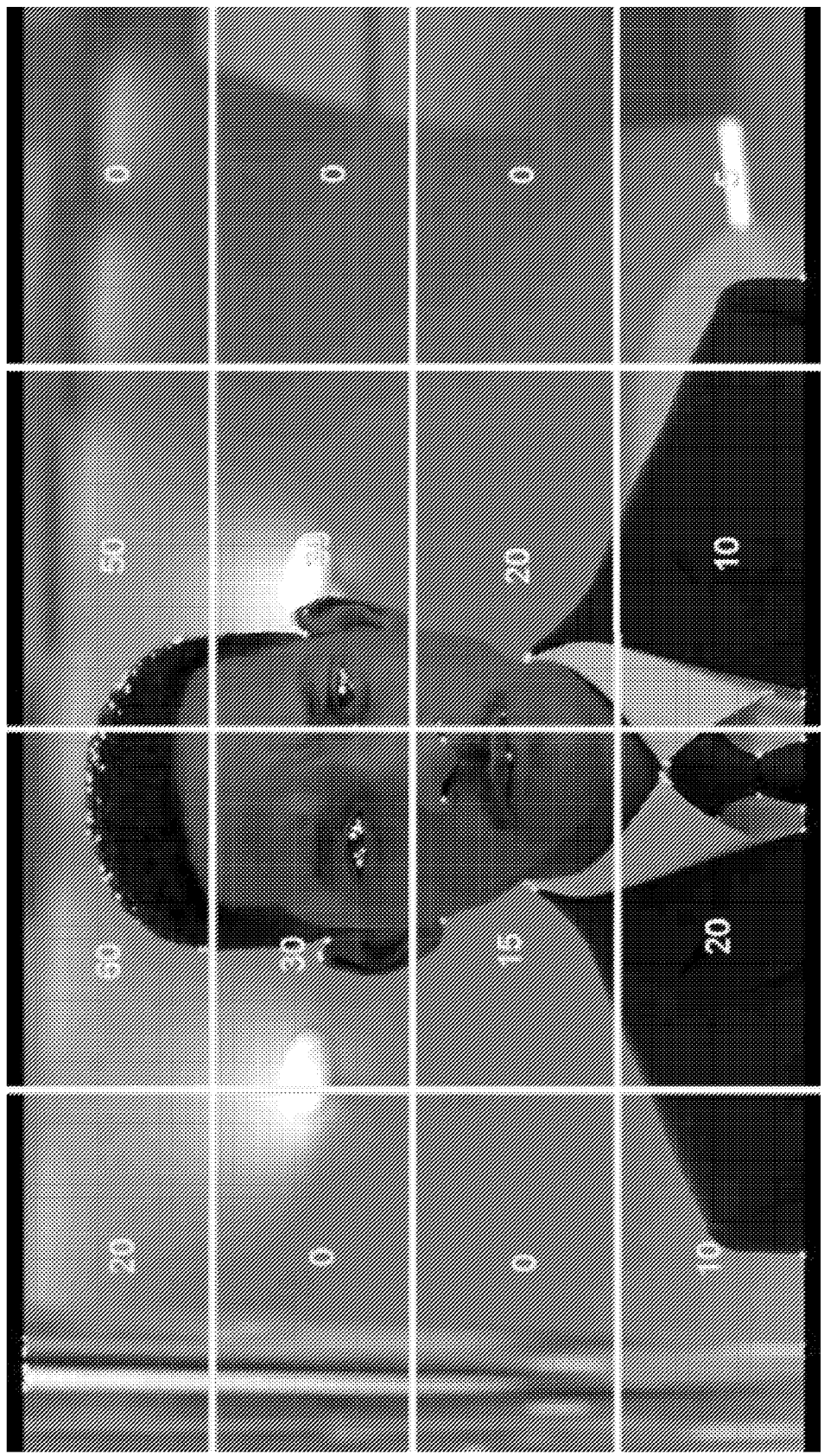
FIG. 5 shows the count of the number of features in each bin of FIG. 4.
Figure 6:
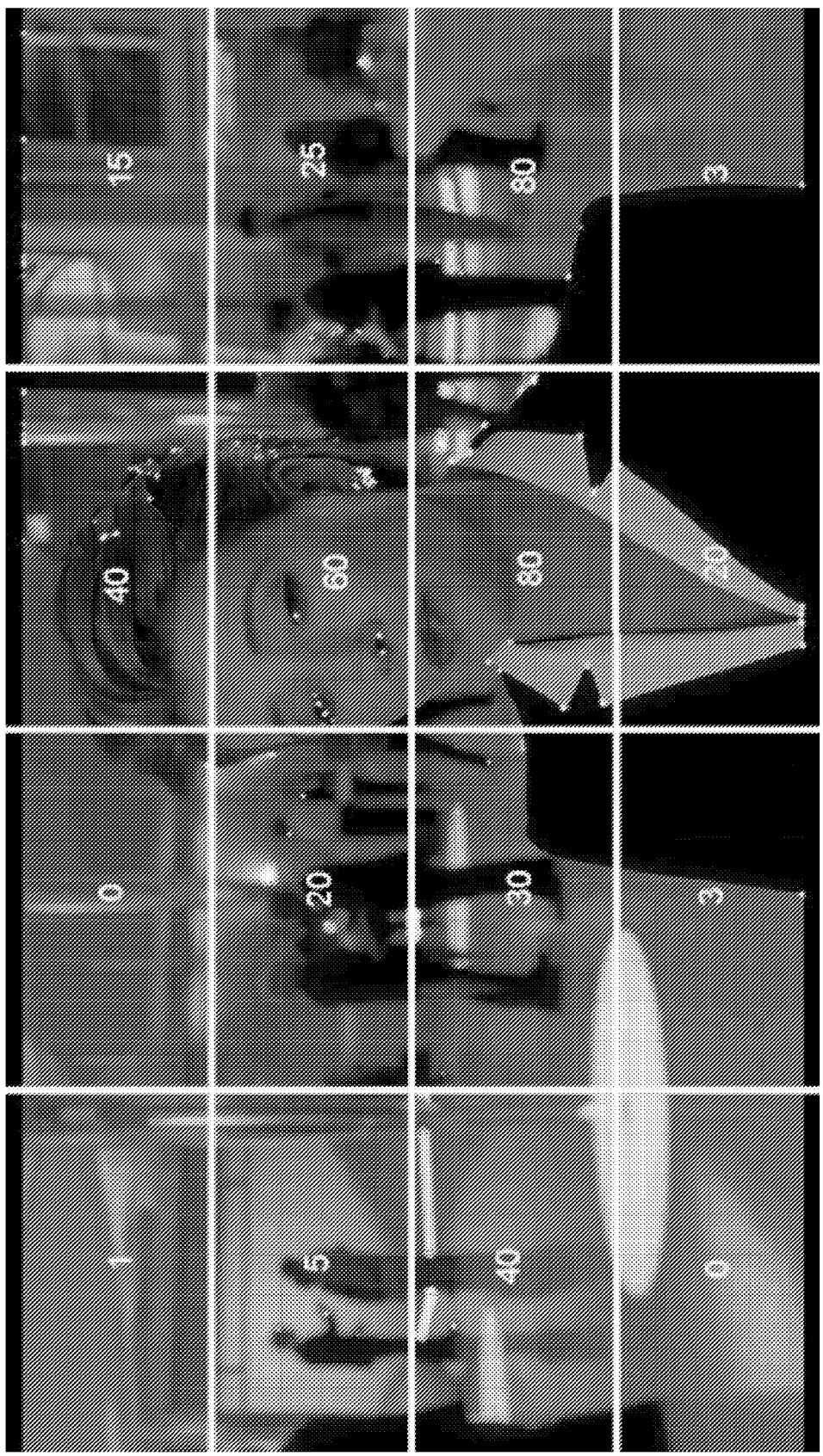
FIG. 6 is another image from the same movie with different "feature bins"
Figure 7:
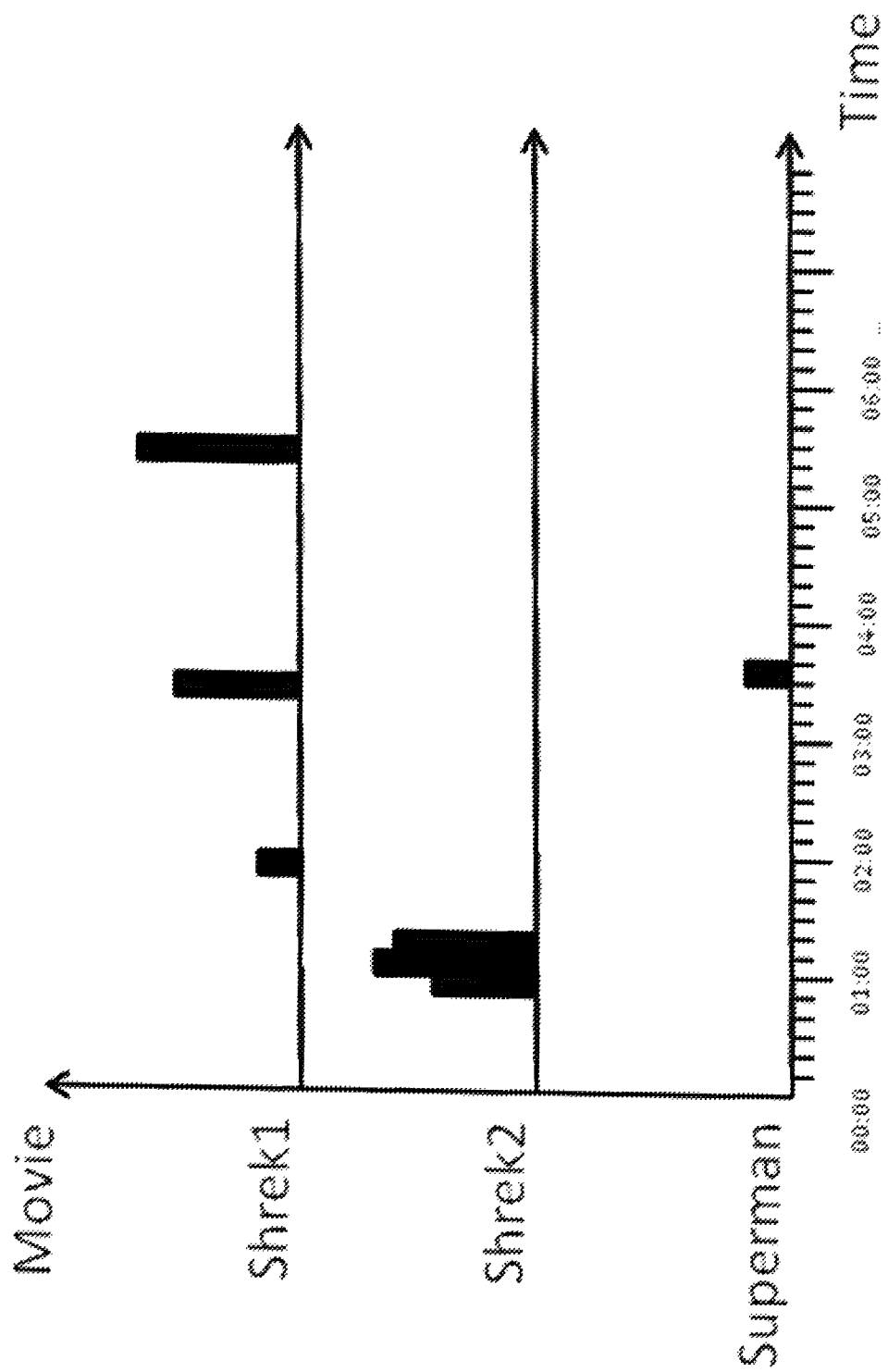
FIG. 7 is an example of a client result aggregation histogram.

The client "smart" capture image selection process is schematically illustrated in FIG. 2. On the client side it is important for the invention to perform at its optimum, to send images that follow certain criteria:
  a. The image has enough details (features, to enable good matching results), as illustrated in FIG. 3.
  b. The image has good conditions (brightness, focus etc).
  c. The image is different from previously sent images. This can be determined for example, if the features spatial distribution is significantly different from last image sent. A graphic example is seen in FIGS. 5-6, where each picture is divided into 16 areas (bins) for which the number of features is counted (the number of features found is written inside the bin). Looking for example at the upper left area of FIG. 5, 20 features can be counted while in FIG. 6 only one feature is present.
2) FIG. 2 also shows the server results aggregation. The aggregation process and decision is done by the client and is composed of the following stages:
  a. Each result returned from the matching server is added to a time histogram (see FIG. 7). The histogram divides each film into short time slots (For example 10 seconds in FIG. 7).
  b. With each result added to the histogram all histograms are checked for a significant maximum point. This is done by applying a moving window to each histogram and summing the results. The window size is equal to the time that elapsed from the beginning of the identification process. In one embodiment of the invention this process is carried out at the client side although, of course, if desired for any reason, it could also be performed at the server side.
  c. If a summary of results in a window is bigger by certain threshold from all other windows a winner is declared.

EXAMPLE

The following is an example of a system according to one embodiment of the invention. The image similarity assessment module runs on the server. The server was implemented as a JEE web application running on Tomcat (Apache Tomcat 6.0) for convenience. It uses the HTTP protocol to communicate with the client, i.e. receive images and sends back the names of matching images along with matching scores.

The core problem is how to match large sets (millions) of images. A large scale image retrieval system (Matas, J., Chum, 0., "Large Scale Image Retrieval" (2010), http://cw.felk.cvut.cz/lib/exe/fetch.php/courses/a4m33mpv/2010.03.08_large-cale-image-retrieval.pdf) was modified to support multi-threading and multi-processing. As understood by the skilled person, multi-threading allows to run the recognition process in several threads, thus reducing the time necessary to recognize a single picture. Multi-processing allows to simultaneously run the recognition for several images on separate cores, thus taking full advantage of the available machine.

The system utilizes several concepts. This is visible in FIG. 7. The similarity assessment relies on matching the similarity of local features. This kind of approach has many benefits, mostly importantly robustness to affine transformations and partial occlusions.

Figure 8:
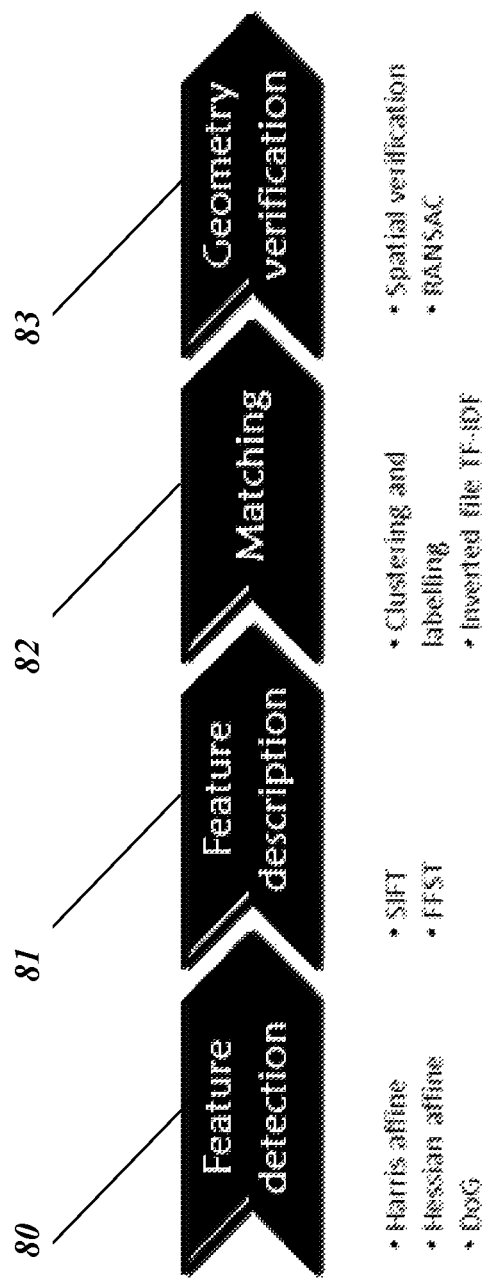
FIG. 8 schematically illustrates similarity matching stages according to the invention. In Stage 80 feature detection is carried out, using for instance methods like Harris affine, Hessian affine and DoG. In Stage 81 the detected features are categorized using feature description methods like SIFT (scale invariant feature transform) descriptors. In Stage 82 Matching is achieved by utilizing techniques such as clustering and labeling and inverted file. Finally, in Stage 83, Geometry verification is carried out using spatial verification and RANSAC.

The first stage consists of calculating features points (see FIG. 8—stage 80). The Hessian affine region detector is used for this purpose, so that the regions are detected invariantly to affine transformations. Affine transformations are a very good approximation of all real (projective) transformations.

After the feature points are detected, they are described with Scale-invariant feature transform (SIFT) descriptors (FIG. 8, stage 81). To reduce the amount of stored data, the descriptors (several hundred for each image) are quantized by using a randomized forest of k-d trees. The approach follows that described in David G. Lowe, "Distinctive image features from scale-invariant keypoints," *International Journal of Computer Vision*, 60, 2 (2004), pp. 91-110. This allows a great reduction of the amount of stored data, as each 128-dimensional descriptor becomes represented by 3 bytes. This compressed representation is commonly described in literature as "visual words". The visual words are saved along with their respective local geometries and associated images in a structure called the "inverted file", allowing fast retrieval of images for a given feature. The "inverted file" structure is well known to persons skilled in the art (and described, for instance in http://en.wikipedia.org/wiki/Inverted_index) and therefore it is not discussed herein, for the sake of brevity.

The image matching process (FIG. 8, stage 82) starts by matching local feature points. If a sufficient number of matches can be established for two images, the corresponding geometry is verified (FIG. 8, stage 83) to ensure that the structures within the images are really similar to each other. If this stage completes successfully, the final matching score is calculated.

The described system was tested for indexing 5 million images, and is capable of indexing hundreds of millions of images if multiple machines are used for storage. The original software referenced above, designed by Matas, J., and Chum, O., allowed for the retrieval of a single image in around 5-10 s. This result was improved to the level of 1-2 s by implementing adaptive image scaling, multithreading, and parallel processing.

Image scaling involved simply choosing a specific size of the image that would be a good tradeoff between processing time and retrieval accuracy.

Multithreading was implemented for extracting features (calculating descriptors) in a single image. The process of extracting features involves preprocessing of the image (like blurring). Generally the image was divided into several regions, and each region was processed by a different thread. Also, Once the descriptors are calculated, they need to be quantized into the 3 byte form. Assigning appropriate labels of the k-d tree to calculated descriptors also involves multi-threading. However, the process of retrieval with known features was so fast that multithreading didn't provide a sensible improvement.

Multiple processing involves only parallel processing of different images. Generally a master process receives all requests to recognize images, and assigns each new image to the next free process. If all processes are busy, the first one to become free will get the first waiting image from the queue. The number of processes that can be used depends on the available CPU, and in the tests performed by the inventors it was a configurable parameter, and 2 and 4 processes were used.

It should be understood that having a robust image similarity matching module isn't sufficient for matching whole movies. Indexing every frame in a movie is infeasible when a larger number of movies is considered.

One possible approach would be to index one frame every period of time, for instance 0.5 second. This however poses the problem that frames sent every second from the client could be significantly different even for the same movie, if the time shift was around ¼ s. To resolve both problems, a new approach was used. Both for indexing, and for sending images from client to server, the frame was used only if it changed significantly compared to the previous frames. To assess the change, Features from Accelerated Segment Test (FAST) descriptors were calculated for 16 regions of the frame. Then a difference was calculated between the numbers of features in corresponding regions. If this difference was above a certain threshold, the image was deemed sufficiently different to be sent to the server/indexed. This approach allowed indexing a 2-hour long movie using approximately only 3600 images.

The client module was designed to send new images to the server based on this approach, but only while it is not sure which movie is being recognized. The decision regarding which movie is being shown is made based on time histograms created for each movie. The approach can be summarized in three steps:

1. Each result returned from the matching server is added to a time histogram. The histogram divides each film to short time slots.
2. With each result added to the histogram all histograms are checked for a significant maximum point. This is done by applying a moving window to each histogram and summing the results.
3. If a sum of results in a window is bigger by certain threshold from all other windows, a winner is declared.

All the above description has been provided for the purpose of illustration and is not intended to limit the invention in any way, except as per the appended claims.

The invention claimed is:

1. A method for identifying a stream of images, comprising:
    a) capturing, by a client mobile device, a plurality of frames from a video media which is to be identified;
    b) selecting, by said client device, one or more matchable frames from said captured plurality of frames, wherein identifiable features of each of said one or more matchable frames are significantly different than identifiable features of a previously captured frame;
    c) sending said selected one or more matchable frames as queries from said client device to a matching server comprising a database in which are stored one or more abridged movies, wherein all two sequentially adjacent frames in each of said stored one or more abridged movies are significantly different from one another;
    d) at the matching server, comparing said selected one or more matchable frames with all frames stored in said database to output a result to said client device which is indicative of a matched frame;
    e) if more than one frame is outputted, aggregating the matching server's various results; and
    f) displaying the outputted results to said client device, whereby to identify said captured frames.

2. The method according to claim 1, wherein
    i) each result returned from the matching server is added to a time histogram;
    ii) the histogram divides each movie to short time slots;
    iii) with each result added to the histogram, all histograms are checked for a significant maximum point by applying a moving window to each histogram and summing the results; and
    iv) if a sum of results in a window is bigger by a desired threshold from all other windows, declaring a winner.

3. A system for identifying a stream of images, comprising:
    a) one or more servers associated with storage comprising a database in which are stored one or more abridged movies, wherein all two sequentially adjacent frames in each of said stored one or more abridged movies are significantly different from one another; and
    b) a client mobile device, for capturing a plurality of frames from a video media which is to be identified, for processing said captured films so as to select therefrom one or more matchable frames, wherein identifiable features of each of said one more matchable frames are significantly different than identifiable features of a previously captured frame, and transmitting said selected one or more matchable frames as queries to said one or more servers;
    wherein said one or more servers are provided with circuitry for analyzing said one or more transmitted matchable frames and for outputting a result which is indicative of a matched frame, and with communication lines through which data associated with said outputted result is exchangeable with said client device, whereby to identify said captured frames.

* * * * *